(12) United States Patent
Fuchigami et al.

(10) Patent No.: US 10,174,775 B2
(45) Date of Patent: Jan. 8, 2019

(54) FASTENING TARGET MEMBER AND FASTENING STRUCTURE

(71) Applicant: FUJI XEROX Co., Ltd., Tokyo (JP)

(72) Inventors: Makoto Fuchigami, Kanagawa (JP); Masataka Konishi, Kanagawa (JP); Toshiyuki Miyata, Kanagawa (JP)

(73) Assignee: FUJI XEROX CO., LTD., Minato-ku, Tokyo (JP)

( * ) Notice: Subject to any disclaimer, the term of this patent is extended or adjusted under 35 U.S.C. 154(b) by 159 days.

(21) Appl. No.: 15/442,817

(22) Filed: Feb. 27, 2017

(65) Prior Publication Data

US 2018/0051728 A1    Feb. 22, 2018

(30) Foreign Application Priority Data

Aug. 19, 2016  (JP) .................................. 2016-161079

(51) Int. Cl.
*F16B 5/02* (2006.01)
*B25B 7/02* (2006.01)
*F16B 23/00* (2006.01)
*F16B 39/10* (2006.01)

(52) U.S. Cl.
CPC ............. *F16B 5/02* (2013.01); *B25B 7/02* (2013.01); *F16B 23/00* (2013.01); *F16B 39/105* (2013.01)

(58) Field of Classification Search
CPC .......... F16B 5/02; F16B 5/0208; F16B 23/00; F16B 35/00; F16B 35/005; F16B 39/103; F16B 39/105; F16B 39/108; B25B 7/02; B25B 27/18
USPC ................. 411/103, 122, 123, 379, 383, 393
See application file for complete search history.

(56) References Cited

U.S. PATENT DOCUMENTS

| 938,503 | A | * | 11/1909 | McIlwain | F16B 39/103 411/122 |
| 1,281,369 | A | * | 10/1918 | Hiller | F16B 39/108 411/124 |
| 1,296,954 | A | * | 3/1919 | Haus | F16B 5/02 403/376 |
| 1,796,781 | A | * | 3/1931 | Fullman | F16B 5/02 411/378 |
| 4,348,140 | A | * | 9/1982 | Bergholz | F16B 5/0208 403/408.1 |
| 8,347,635 | B2 | * | 1/2013 | Durocher | F01D 25/162 29/464 |

FOREIGN PATENT DOCUMENTS

JP    2014-094441 A    5/2014

* cited by examiner

Primary Examiner — Roberta S Delisle
(74) Attorney, Agent, or Firm — Sughrue Mion, PLLC (57) ABSTRACT

There is provided a fastening target member attached to an attachment member by a fastening member that includes a head and a shaft. The fastening target member has a surface, at least one insertion hole that allows the shaft of the fastening member to be inserted therethrough, and a fastening member removal structure that is formed in the surface of the fastening target member where the head of the fastening member is disposed and that has a pair of grooves. The pair of grooves face each other with the at least one insertion hole interposed therebetween. The pair of grooves are each formed from an inner circumferential side relative to the outer diameter of the head of the fastening member to an outer circumferential side relative to the outer diameter of the head of the fastening member.

9 Claims, 9 Drawing Sheets

FASTENING TARGET MEMBER AND FASTENING STRUCTURE

CROSS-REFERENCE TO RELATED APPLICATIONS

This application is based on and claims priority under 35 USC 119 from Japanese Patent Application No. 2016-161079 filed Aug. 19, 2016.

BACKGROUND

Technical Field

The present invention relates to a fastening target member and a fastening structure.

SUMMARY

According to an aspect of the present invention, a fastening target member is provided. The fastening target member having a surface is attached to an attachment member by a fastening member that includes a head and a shaft. The head has a predetermined diameter and an outer diameter. The shaft has a smaller diameter than the diameter of the head. A thread is formed on the shaft. The fastening target member has at least one insertion hole that allows the shaft of the fastening member to be inserted therethrough. The fastening target member also has a fastening member removal structure that is formed in the surface of the fastening target member where the head of the fastening member is disposed and that has a pair of grooves. The pair of grooves face each other with the at least one insertion hole interposed therebetween. The pair of grooves are each formed from an inner circumferential side relative to the outer diameter of the head of the fastening member to an outer circumferential side relative to the outer diameter of the head of the fastening member.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described below with reference to the drawings. It should be understood that the following exemplary embodiments exemplify a fastening target member having a fastening member removal structure for embodying a technical concept of the present invention and are not intended to define the present invention. The present invention is equally applicable to other exemplary embodiments included in the scope of the claims.

First Exemplary Embodiment

Referring first to FIGS. 1 to 4B, a fastening target member 10 included in a fastening structure 100 according to a first exemplary embodiment is described. The fastening target member 10 according to the first exemplary embodiment has a fastening member removal structure 18. The fastening target member 10 is included in a product such as an image forming apparatus assembled by using a fastening member 30. The fastening target member 10 is fastened and attached to an attachment member 60 included in the product by the fastening member 30 such as a screw, thereby being incorporated in the product. Furthermore, the fastening structure 100 according to the first exemplary embodiment refers to a structure in which the fastening target member 10 and the attachment member 60 are attached to each other by the fastening member 30.

Figure 1:
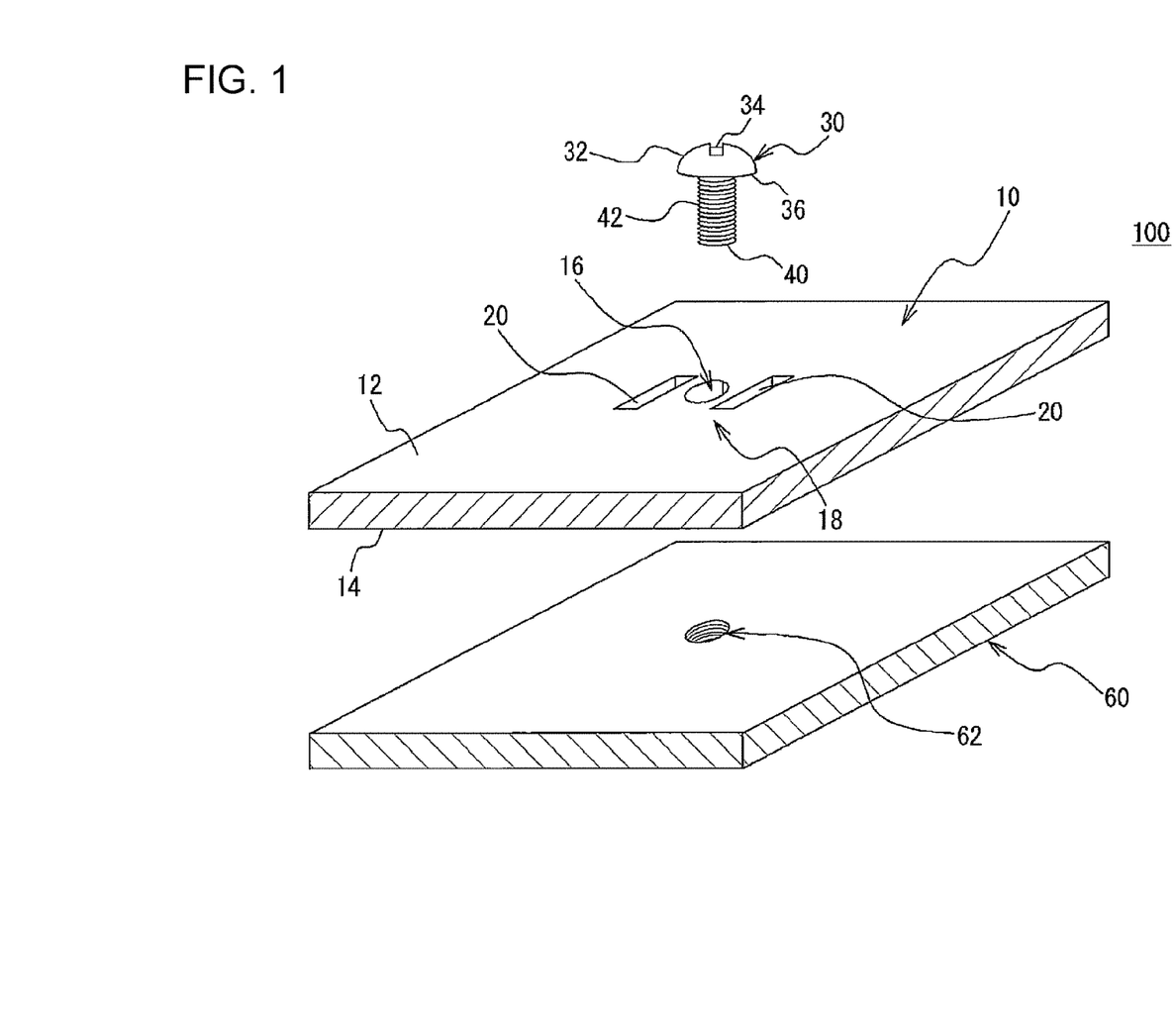
FIG. 1 is a perspective view of a fastening target member, an attachment member, and a fastening member according to a first exemplary embodiment.
Figure 2A:
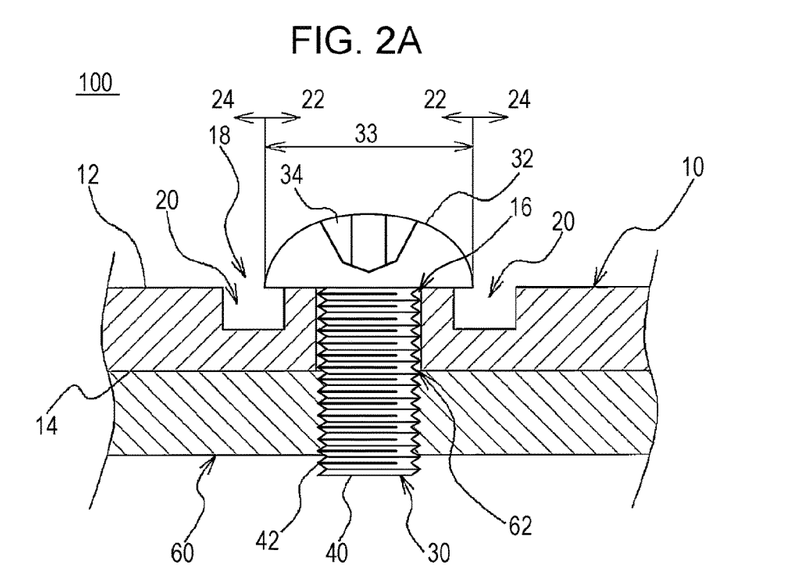
FIGS. 2A and 2B are respectively a sectional view and a plan view of the fastening target member, the attachment member, and the fastening member according to the first exemplary embodiment.

First, the fastening member 30 for fastening the fastening target member 10 according to the first exemplary embodiment is described. As illustrated in FIGS. 1 and 2A, according to the first exemplary embodiment, the fastening member 30 that fastens the fastening target member 10 to the attachment member 60 includes a head 32, a shaft 40, and a thread 42. The circular head 32 has a predetermined diameter and an operating recess 34 into which a driver or the like is inserted so as to be rotated. The shaft 40 extends from the opposite side of the head 32 to the side where the operating recess 34 is formed. The shaft 40 has a columnar shape having a smaller diameter than the diameter of the head and having a predetermined length. The thread 42 includes a helical projection and a helical recess formed on the outer circumference of the shaft 40. Furthermore, the head 32 of the fastening member 30 according to the first exemplary embodiment is a so-called pan-head type having a substantially hemispherical shape.

Furthermore, the attachment member 60 to which the fastening target member 10 according to the first exemplary embodiment is attached is included in the product and, as illustrated in FIGS. 1 and 2A, is formed of a metal plate-shaped body or a metal bar-shaped body having a sufficient size for attachment of the fastening target member 10. The attachment member 60 has an attachment hole 62 having a helical projection and a helical recess to which the thread 42 of the fastening member 30 is fastened.

Figure 2B:
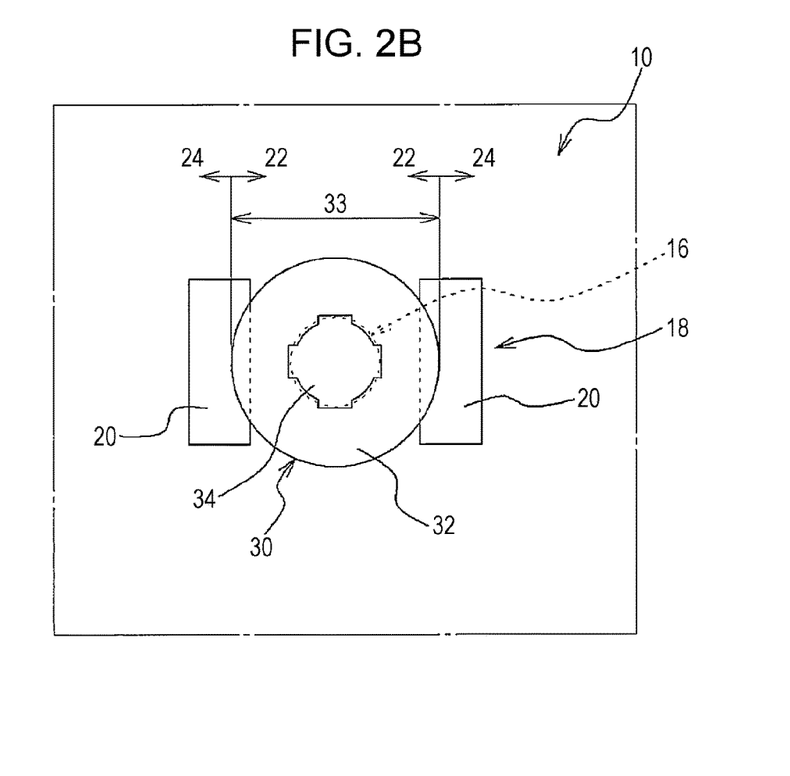

Next, referring to FIGS. 1 to 2B, the fastening target member 10 having the fastening member removal structure 18 according to the first exemplary embodiment is described. Although the entirety of the fastening target member 10 has any of a variety of sizes, shapes, and so forth so as to be included in the product, a portion of the fastening target member 10 where the fastening member removal structure 18 is formed is a plate-shaped body formed of, for example, a metal material and having a predetermined thickness. This portion has a front surface 12 on one side and a rear surface 14 on the other side. The fastening member 30 is inserted through the fastening target member 10 from the front surface 12 and the head 32 is disposed on the front surface 12. The rear surface 14 is in contact with the attachment member 60. It is noted that most of description of the first exemplary embodiment is dedicated to the portion of the fastening target member 10 where the fastening member removal structure 18 is formed.

Furthermore, at least one insertion hole 16 is formed through the fastening target member 10 from the front surface 12 to the rear surface 14. The shaft 40 of the fastening member 30 is inserted through the insertion hole 16. The inner surface of this insertion hole 16 is smooth so as to allow the shaft 40 of the fastening member 30 to be inserted therethrough. The insertion hole 16 is disposed corresponding to the position and the shape of part of the product where the fastening target member 10 is used and is formed corresponding to the attachment hole 62 formed in the attachment member 60.

A pair of grooves 20 as the fastening member removal structure 18 are formed around the insertion hole 16 of the fastening target member 10. Each of the pair of grooves 20 is formed in a portion of the front surface 12 recessed toward the rear surface 14 side in the fastening target member 10. At the portions of the front surface 12 where the pair of grooves 20 are formed, the thickness is smaller than that of the fastening target member 10. According to the first exemplary embodiment, the pair of grooves 20 each have a rectangular recessed shape.

Furthermore, each of the pair of grooves 20 is formed at a position separated from the insertion hole 16 by a predetermined distance. A region where the groove 20 is formed extends from a position of an inner circumferential side 22 relative to an outer diameter 33 of the head 32 to a position of an outer circumferential side 24 relative to the outer diameter 33 of the head 32 when the fastening target member 10 is attached to the attachment member 60 and the head 32 of the fastening member 30 is disposed on the front surface 12 of the fastening target member 10. That is, the outer diameter 33 of the head 32 is partially superposed on the groove 20. In this state, the inner circumferential side 22 of the groove 20 is separated from the insertion hole 16 by a predetermined distance. This allows a force to be applied to the fastening target member 10 through a lower portion 36 of the head 32 of the fastening member 30.

Furthermore, the inner circumferential side 22 of the groove 20 relative to the outer diameter 33 of the head 32 of the fastening member 30 is formed from a position closer to the insertion hole 16 than, at the farthest from the insertion hole 16, a position corresponding to the outer diameter 33 of the head 32. This may ensure movement distances for a pair of long-nose pliers 70 for deforming the head 32. The deformation of the head 32 with the long-nose pliers 70 will be described later.

Furthermore, the pair of grooves 20 are used for removal of the fastening member 30. The removal of the fastening member 30 will be described later. Accordingly, the pair of grooves 20 have sizes and depths that allow the tips of the long-nose pliers 70 or another pinching tool for the removal of the fastening member 30 to be inserted thereinto (see FIGS. 3A and 3B).

Attachment of the fastening target member 10 to the attachment member 60 by the fastening member 30 is performed in a step in the assembly of the product. First in this attachment, the rear surface 14 side of the fastening target member 10 and the attachment member 60 are brought into contact with each other such that the insertion hole 16 of the fastening target member 10 and the attachment hole 62 of the attachment member 60 are aligned with each other. Then, the shaft 40 of the fastening member 30 is inserted first into the insertion hole 16 of the fastening target member 10. After the shaft 40 has reached the attachment hole 62 of the attachment member 60, the operating recess 34 of the head 32 of the fastening member 30 is rotated with a fastening tool. This causes the thread 42 to be rotated, and accordingly, the thread 42 is fastened to the attachment hole 62 of the attachment member 60. Thus, the fastening target member 10 has been attached to the attachment member 60.

Next, a method of removing the fastening member 30 having been fastened to the fastening target member 10 according to the first exemplary embodiment is described with reference to FIGS. 3A to 4B.

As described above, the fastening target member 10 is fastened to the attachment member 60 by the fastening member 30 such as a screw. Furthermore, the fastening member 30 used for the first exemplary embodiment has the head 32 that has a substantially hemispherical shape having a circular outer circumference.

At this time, during the rotation of the operating recess 34 of the fastening member 30 with the driver or another fastening tool, repeating the fastening plural times or performing the fastening with a larger force than intended may distort the shape of the operating recess 34 of the head 32 of the fastening member 30, and accordingly, the operating recess 34 may become unusable. When the shape of the operating recess 34 of the head 32 of the fastening member 30 is distorted, operation of the fastening member 30 with the fastening tool may become impossible. This may lead to a situation in which the fastening member 30 becomes unable to be removed.

Figure 5:
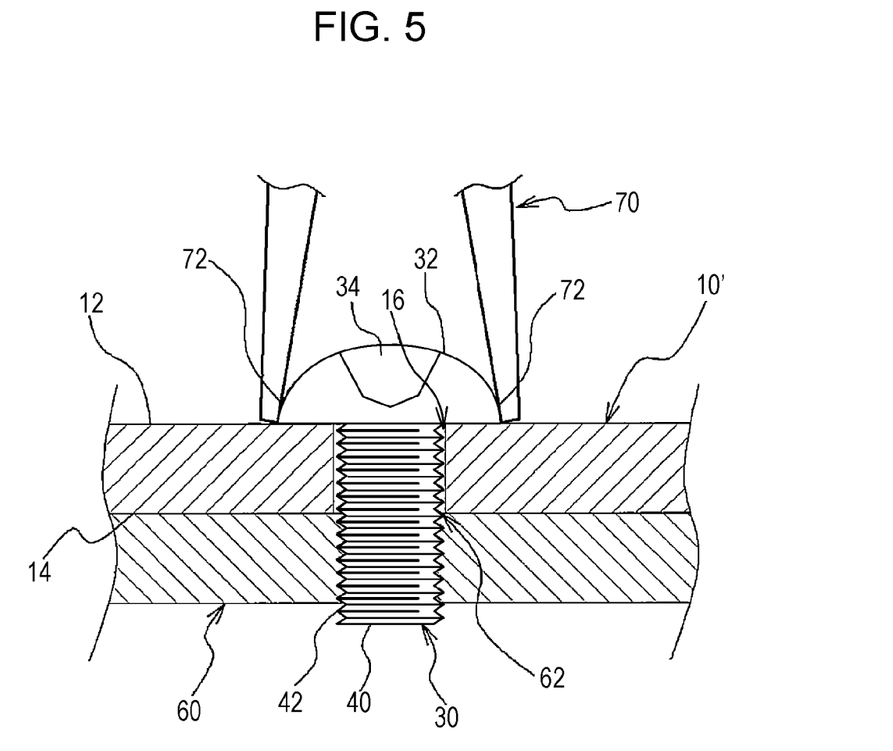
FIG. 5 is a sectional view illustrating removal of the fastening member from the related-art fastening target member.

Furthermore, when the head 32 of the fastening member 30 is pinched and rotated with a pinching tool such as the long-nose pliers 70 or pliers of another type (the pinching tool is represented by the long-nose pliers 70 for description hereafter), in the case where a fastening target member 10' has no fastening member removal structure, the rotation of the fastening member 30 is difficult due to difficulty in pinching the head 32 having the hemispherical shape (see FIG. 5).

Figure 3A:
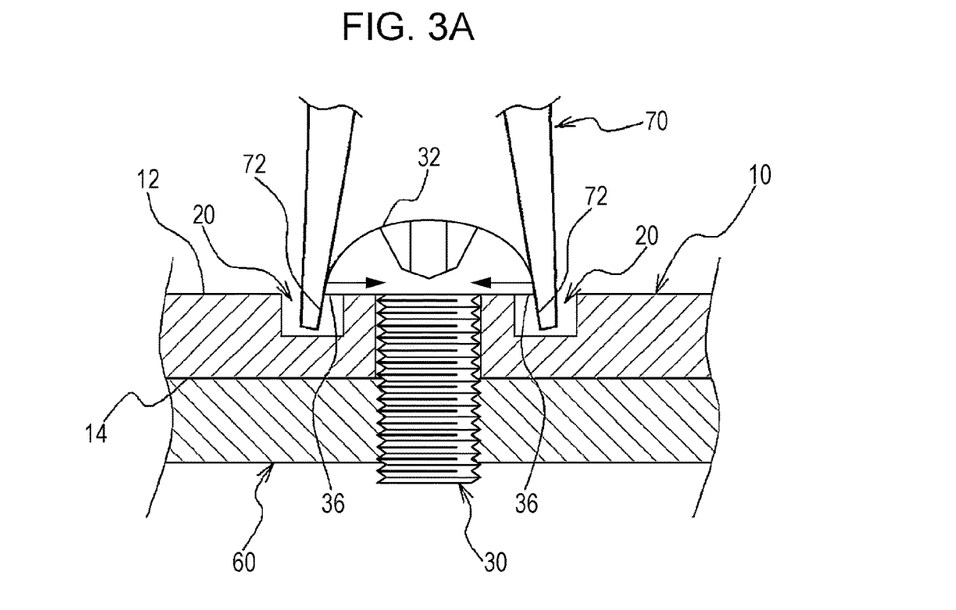
FIGS. 3A and 3B are respectively a sectional view and a plan view of a step of removing the fastening member according to the first exemplary embodiment.
Figure 3B:
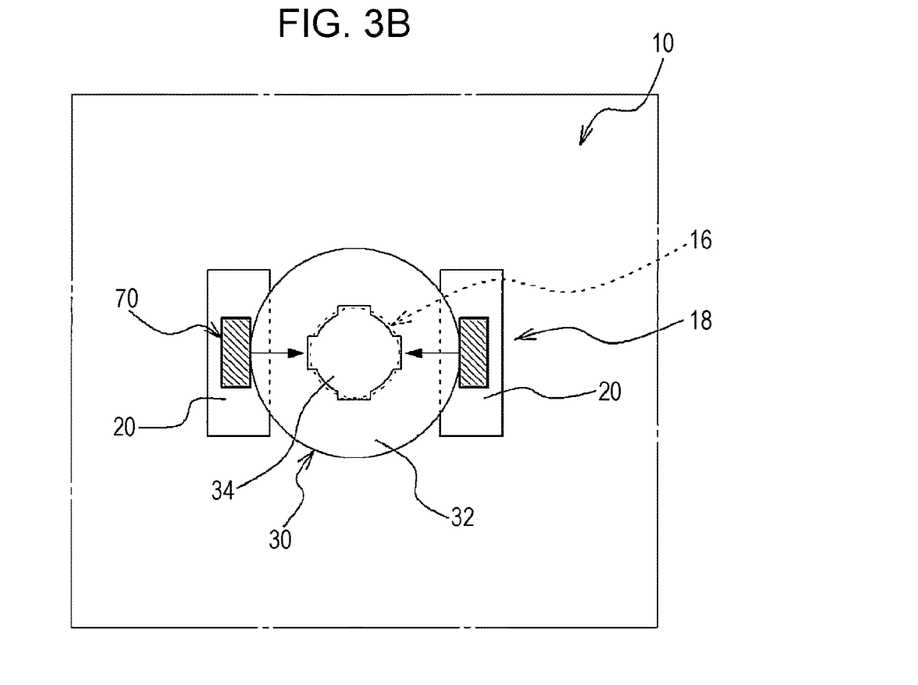

In contrast, as illustrated in FIGS. 3A and 3B, the fastening member removal structure 18 having the pair of grooves 20 is formed in the fastening target member 10 according to the first exemplary embodiment. With the pair of grooves 20, the head 32 of the fastening member 30 are able to be pinched in a state in which tips 72 of the long-nose pliers 70 are inserted into the pair of grooves 20. At this time, since the tips 72 of the long-nose pliers 70 are inserted, portions of the long-nose pliers 70 which have large areas and which is closer to proximal ends of the long-nose pliers 70 than the tips 72 of the long-nose pliers 70 are used to pinch a non-hemispherical portion (referred to as "lower portion 36" hereafter) on the lower side of the head 32 of the fastening member 30. Thus, the head 32 of the fastening member 30 is able to be pinched without slipping.

Figure 4A:
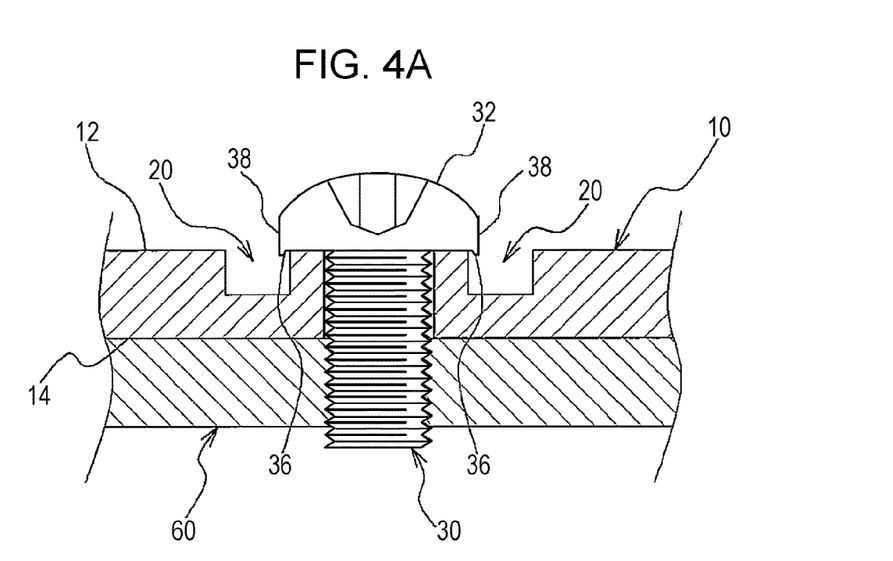
FIGS. 4A and 4B are respectively a sectional view and a plan view of a step of removing the fastening member according to the first exemplary embodiment, respectively following FIGS. 3A and 3B.
Figure 4B:
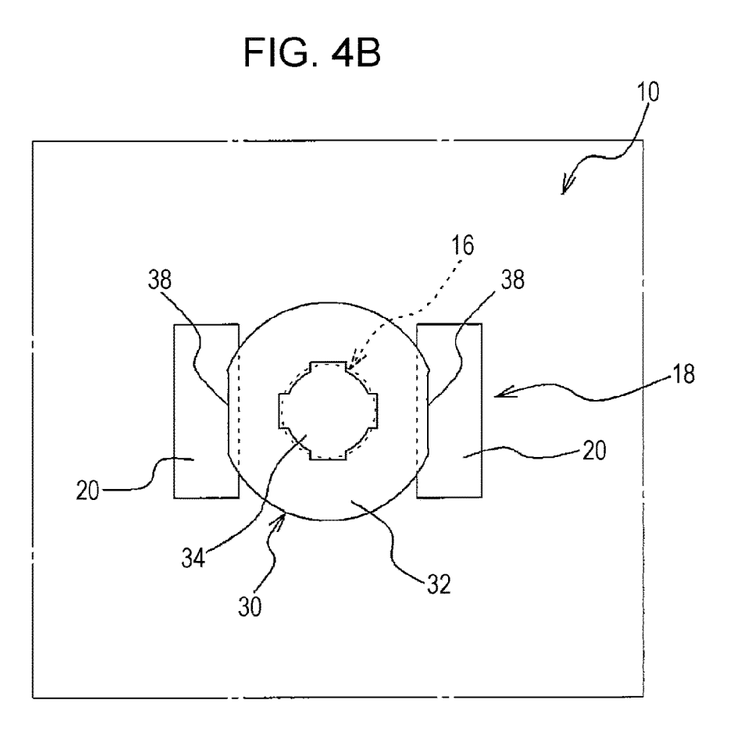

After that, as illustrated in FIGS. 4A and 4B, forces are applied to the long-nose pliers 70 so as to compress and deform a portion of the lower portion 36 of the hemispherical head 32 pinched with the long-nose pliers 70. Thus, flat portions 38 having flat shapes are able to be formed in parts of the hemispherical head 32. At this time, with the pair of grooves 20 formed in the fastening target member 10 as is the case with the first exemplary embodiment, portions of the head 32 of the fastening member 30 having been compressed and deformed are able to be accommodated in the pair of grooves 20. This may facilitate the deformation of the head 32 of the fastening member 30.

Then, the fastening member 30 which has become unable to be operated is able to be removed by pinching the flat portions 38 having the flat shapes of the lower portion 36 of the head 32 with the long-nose pliers 70 or the like to rotate the fastening member 30. At this time, in order to pinch the head 32 of the fastening member 30 with the tips 72 of the long-nose pliers 70, the head of the fastening member 30 may be approached either in an insertion/removal direction of the head of the fastening member 30 or in a direction perpendicular to the axial direction, that is, a direction parallel to the fastening target member 10.

Thus, the fastening member 30 which had become unable to be operated due to the distortion of the shape of the operating recess 34 of the head 32 has been removed.

First Variant

Although the pair of grooves 20 are the rectangular recesses according to the first exemplary embodiment, this is not limiting. The pair of grooves 20 may have sizes, depths, and shapes that allow the long-nose pliers 70 or another pinching tool pinching the head 32 of the fastening member 30 to be inserted thereinto.

Figure 6A:
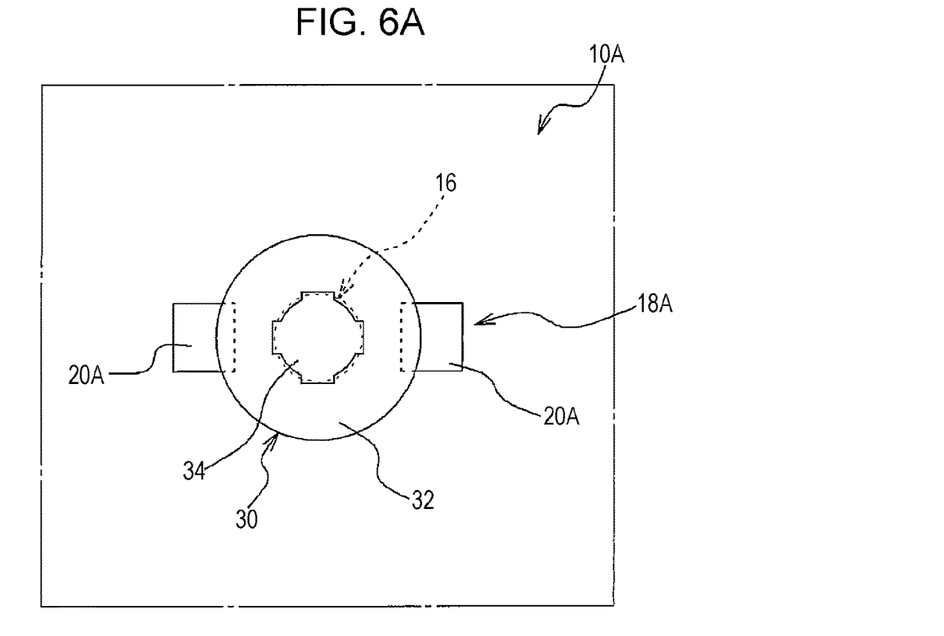
FIG. 6A is a plan view of a variant of the first exemplary embodiment.

For example, as illustrated in FIG. 6A, a pair of grooves 20A as a fastening member removal structure 18A formed in a fastening target member 10A may have smaller sizes than those of the pair of grooves 20 according to the first exemplary embodiment. With such a pair of grooves 20A, the fastening member removal structure is able to be formed in the fastening target member which needs to have strength. The shapes of the pair of grooves are not necessarily quadrangle shapes. The pair of grooves each may have another shape such as a circular shape or an elliptic shape.

Second Variant

Figure 6B:
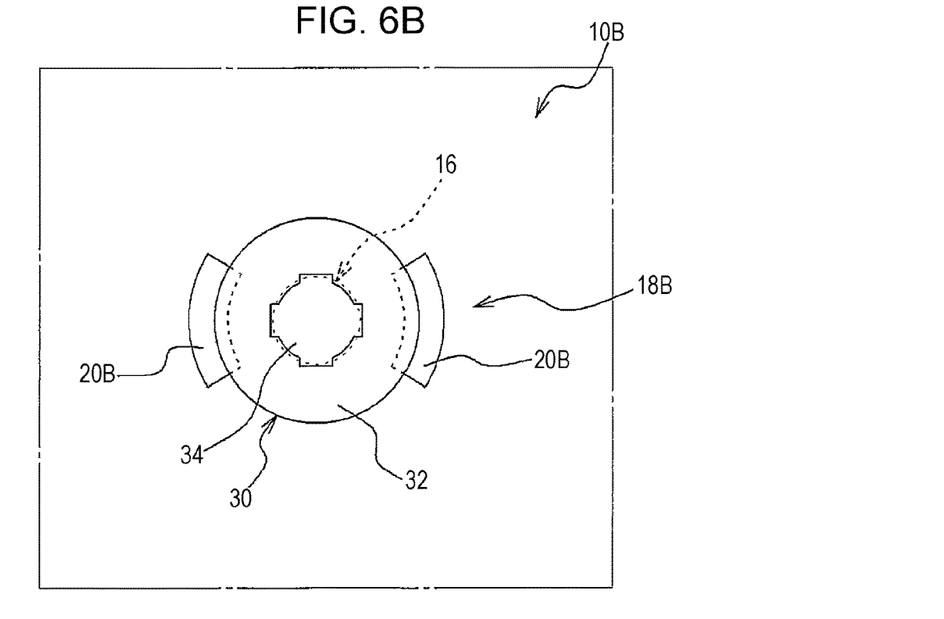
FIG. 6B is a plan view of another variant of the first exemplary embodiment.

Furthermore, similar to or the same as a pair of grooves 20B as a fastening member removal structure 18B formed in a fastening target member 10B as illustrated in FIG. 6B, the pair of grooves may be curved along the rotational direction of the fastening member 30. With such a pair of grooves 20B, the fastening member 30 is able to be rotated together with the long-nose pliers 70 along the shapes of the pair of grooves 20B in a state in which the head 32 is pinched and deformed with the long-nose pliers 70. This may allow the fastening member 30 to be efficiently removed.

Third Variant

Figure 7A:
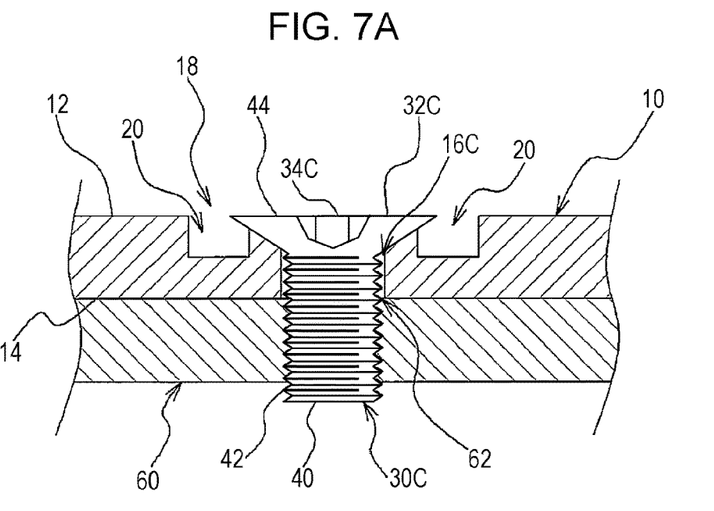
FIG. 7A is a sectional view of yet another variant of the first exemplary embodiment.

Furthermore, as the fastening member that has the head 32 and fastens the fastening target member 10, as illustrated in FIG. 7A, a so-called countersunk screw 30C as a fastening member having a head 32C having a flat upper surface 44 may be used instead of the fastening member 30 of the first exemplary embodiment having the hemispherical head 32. That is, even when the fastening target member 10 is attached to the attachment member 60 with the countersunk screw 30C, in the case where the shape of an operating recess 34C for operation is distorted, the countersunk screw 30C may become unable to be operated, and accordingly, the countersunk screw 30C may be unable to be removed.

Thus, with the fastening target member 10 having the fastening member removal structure 18 according to the first exemplary embodiment, even when the countersunk screw 30C is used, part of the head 32C of the countersunk screw 30C is pinched and deformed so as to form a flat portion 38C as is the case with the first exemplary embodiment. Accordingly, the countersunk screw 30C is able to be rotated with the long-nose pliers 70 and is able to be removed. When the countersunk screw 30C is used, the shape of an insertion hole 16C of the fastening target member 10 is partially changed so as to correspond to the shape of the countersunk screw 30C.

Fourth Variant

Figure 7B:
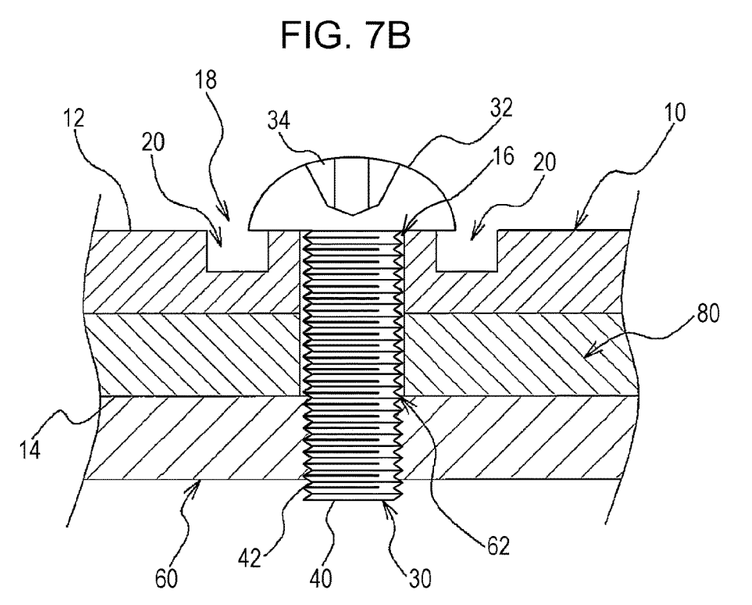
FIG. 7B is a sectional view of yet another variant of the first exemplary embodiment.

Furthermore, instead of directly attaching the fastening target member 10 having the fastening member removal structure 18 to the attachment member 60 as is the case with the first exemplary embodiment, another member 80 may be interposed between the fastening target member 10 and the attachment member 60 as illustrated in FIG. 7B. In this case, the fastening target member 10 is disposed such that the surface of the fastening target member 10 where the fastening member removal structure 18 is formed becomes the front side.

Second Exemplary Embodiment

Figure 8A:
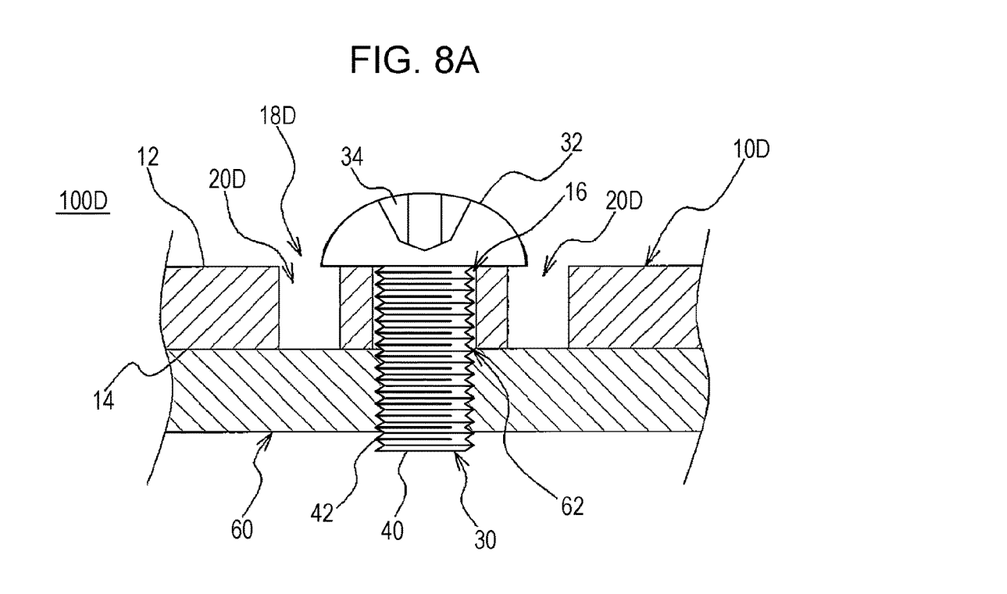
FIGS. 8A and 8B are respectively a sectional view and a plan view of a fastening target member, the attachment member, and the fastening member according to a second exemplary embodiment.
Figure 8B:
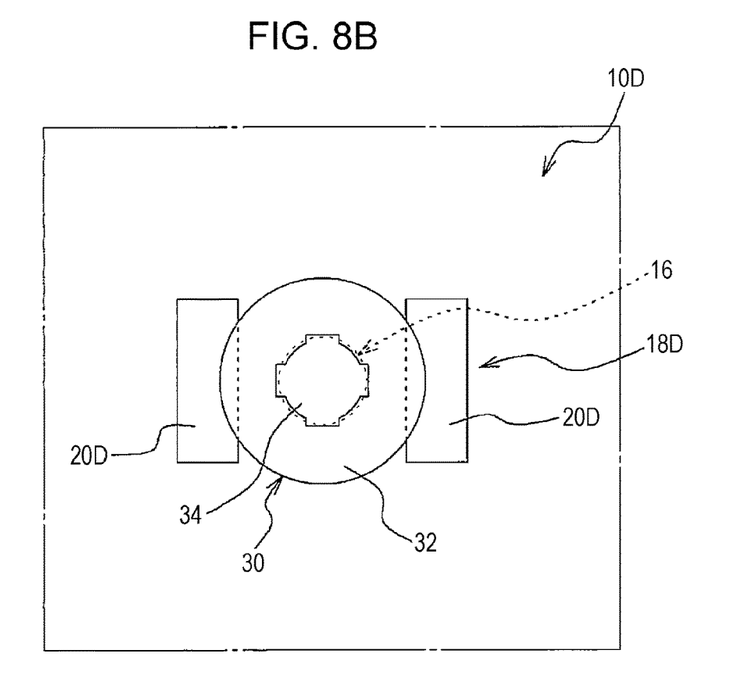

Furthermore, according to the first exemplary embodiment, the fastening member removal structure 18 has the pair of grooves 20. According to a second exemplary embodiment, as illustrated in FIGS. 8A and 8B, a fastening member removal structure 18D has a pair of holes 20D formed in a fastening target member 10D. The only difference between the first exemplary embodiment and the second exemplary embodiment is that the shape of the fastening member removal structure 18 formed in the fastening target member 10 according to the second exemplary embodiment is different from that of the first exemplary embodiment. Thus, the common elements are denoted by the same reference numerals and detailed description thereof is omitted.

Furthermore, a fastening structure 100D according to the second exemplary embodiment is a structure in which the fastening target member 10D according to the second exemplary embodiment and the attachment member 60 are attached to each other by the fastening member 30.

That is, the pair of holes 20D formed in the fastening target member 10D according to the second exemplary embodiment are, as illustrated in FIG. 8A, through holes that penetrate through the fastening target member 10D from the front surface 12 to the rear surface 14.

Figure 9A:
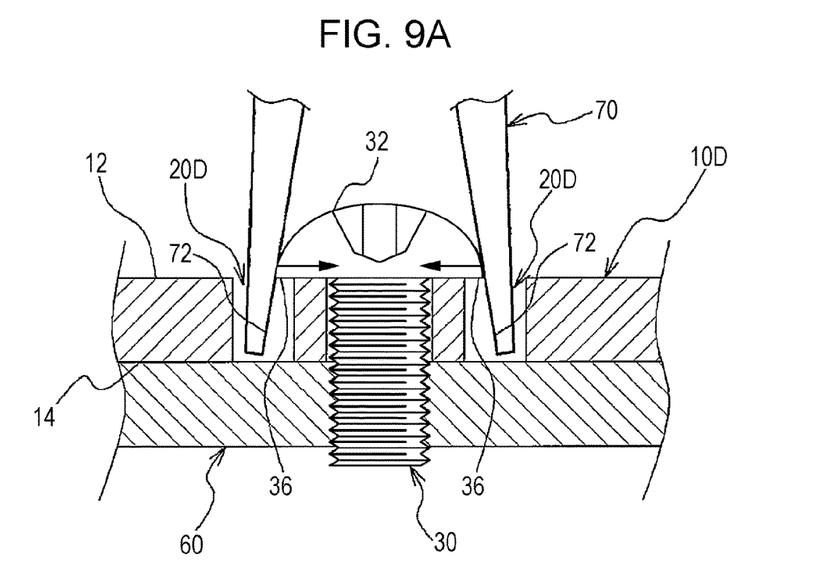
FIGS. 9A and 9B are respectively a sectional view and a plan view of a step of removing the fastening member according to the second exemplary embodiment.
Figure 9B:
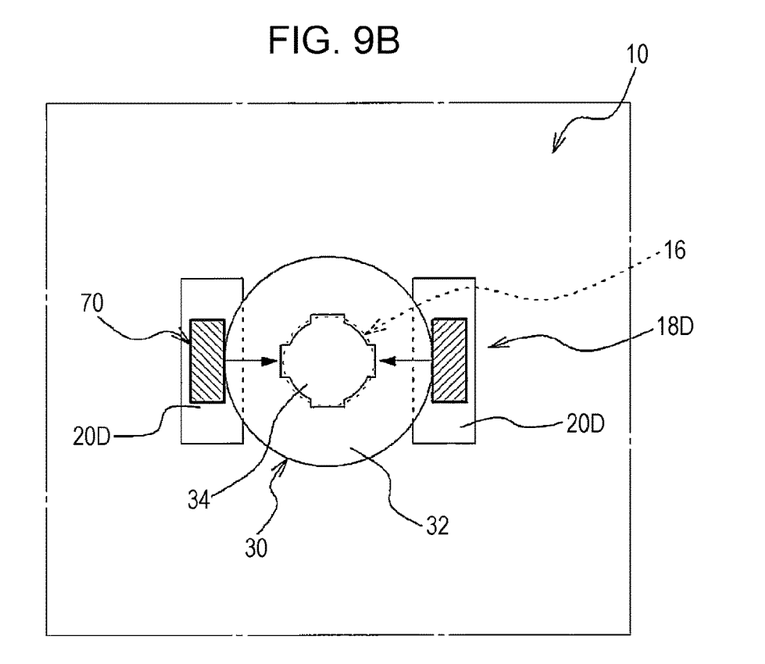

With the fastening member removal structure 18D having the pair of holes 20D as described above, the tips 72 of the long-nose pliers 70 are able to be more deeply inserted as illustrated in FIG. 9A. Furthermore, even when the thickness of the fastening target member is small, the fastening member removal structure 18D is able to be easily formed.

Furthermore, the positions where the pair of holes 20D are formed in the fastening target member 10D according to the second exemplary embodiment are the same as the positions where the pair of grooves 20 are formed in the fastening target member 10 according to the first exemplary embodiment having been described.

Furthermore, with the pair of holes 20D according to the second exemplary embodiment, the elements may have the sizes, the shapes, and so forth that are similar to or the same as those of any of the first to fourth variants of the first exemplary embodiment, and a countersunk screw is able to be used instead of the fastening member having a hemispherical head.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A fastening target member,
wherein the fastening target member having a surface is attached to an attachment member by a fastening member that includes a head which has a predetermined diameter and an outer diameter and a shaft which has a smaller diameter than the diameter of the head and on which a thread is formed, and
wherein the fastening target member has at least one insertion hole that allows the shaft of the fastening member to be inserted therethrough and a fastening member removal structure that is formed in the surface of the fastening target member where the head of the fastening member is disposed and that has a pair of grooves which face each other with the at least one insertion hole interposed therebetween and which are each formed from an inner circumferential side relative to the outer diameter of the head of the fastening member to an outer circumferential side relative to the outer diameter of the head of the fastening member.

2. The fastening target member according to claim 1,
wherein the inner circumferential side of each of the pair of grooves relative to the outer diameter of the head of the fastening member is closer to the at least one insertion hole than, at a farthest from the at least one insertion hole, a position corresponding to the outer diameter of the head, and
wherein the inner circumferential side of each of the pair of grooves relative to the outer diameter of the head of the fastening member has a portion separated from the at least one insertion hole by a predetermined distance.

3. The fastening target member according to claim 2,
wherein each of the pair of grooves is curved along a rotational direction of the fastening member.

4. The fastening target member according to claim 1,
wherein each of the pair of grooves is curved along a rotational direction of the fastening member.

5. A fastening target member,
wherein the fastening target member is attached to an attachment member by a fastening member that includes a head which has a predetermined diameter and an outer diameter and a shaft which has a smaller diameter than the diameter of the head and on which a thread is formed, and
wherein the fastening target member has at least one insertion hole that allows the shaft of the fastening member to be inserted therethrough and a fastening member removal structure that has a pair of holes which penetrate through the fastening target member, which face each other with the at least one insertion hole interposed therebetween, and which are each formed from an inner circumferential side relative to the outer diameter of the head of the fastening member to an outer circumferential side relative to the outer diameter of the head of the fastening member.

6. The fastening target member according to claim 5,
wherein the inner circumferential side of each of the pair of holes relative to the outer diameter of the head of the fastening member is closer to the at least one insertion hole than, at a farthest from the at least one insertion hole, a position corresponding to the outer diameter of the head, and
wherein the inner circumferential side of each of the pair of holes relative to the outer diameter of the head of the fastening member has a portion separated from the at least one insertion hole by a predetermined distance.

7. The fastening target member according to claim 6,
wherein each of the pair of holes is curved along a rotational direction of the fastening member.

8. The fastening target member according to claim 5,
wherein each of the pair of holes is curved along a rotational direction of the fastening member.

9. A fastening structure comprising:
a fastening member that includes
a head which has a predetermined diameter and an outer diameter, and
a shaft which has a smaller diameter than the diameter of the head and on which a thread is formed;
a fastening target member that has a surface, at least one insertion hole allowing the shaft of the fastening member to be inserted therethrough, and a fastening member removal structure formed in the surface of the fastening target member where the head of the fastening member is disposed and having a pair of grooves or a pair of holes which face each other with the at least one insertion hole interposed therebetween and which are each formed from an inner circumferential side relative to the outer diameter of the head of the fastening member to an outer circumferential side relative to the outer diameter of the head of the fastening member; and
an attachment member to which the fastening target member is attached by the fastening member.

* * * * *